US012640316B2

(12) United States Patent
Tannhäuser

(10) Patent No.: US 12,640,316 B2
(45) Date of Patent: May 26, 2026

(54) CIRCUIT BREAKER AND METHOD

(71) Applicant: Siemens Aktiengesellschaft, Munich (DE)

(72) Inventor: Marvin Tannhäuser, Hausen (DE)

(73) Assignee: Siemens Aktiengesellschaft, Munich (DE)

( * ) Notice: Subject to any disclaimer, the term of this patent is extended or adjusted under 35 U.S.C. 154(b) by 246 days.

(21) Appl. No.: 18/696,466

(22) PCT Filed: Sep. 28, 2021

(86) PCT No.: PCT/EP2021/076629
§ 371 (c)(1),
(2) Date: Mar. 28, 2024

(87) PCT Pub. No.: WO2023/051893
PCT Pub. Date: Apr. 6, 2023

(65) Prior Publication Data
US 2025/0046537 A1 Feb. 6, 2025

(51) Int. Cl.
*H01H 9/54* (2006.01)

(52) U.S. Cl.
CPC .................................. *H01H 9/548* (2013.01)

(58) Field of Classification Search
CPC ....... H01H 9/548; H01H 71/12; H01H 71/125
USPC .......................................................... 361/115
See application file for complete search history.

(56) References Cited

U.S. PATENT DOCUMENTS

| | | | | |
|---|---|---|---|---|
| 2008/0012666 | A1* | 1/2008 | Davison | H02H 1/046 361/87 |
| 2016/0293372 | A1* | 10/2016 | Walsh | H02H 3/044 |
| 2017/0004948 | A1 | 1/2017 | Leyh | |
| 2017/0256934 | A1* | 9/2017 | Kennedy | H02H 7/0855 |
| 2020/0365346 | A1* | 11/2020 | Telefus | H02M 1/083 |
| 2021/0066013 | A1* | 3/2021 | Kumar | H01H 71/123 |

* cited by examiner

*Primary Examiner* — Kevin J Comber
(74) *Attorney, Agent, or Firm* — Laurence A. Greenberg; Werner H. Stemer; Ralph E. Locher

(57) ABSTRACT

A circuit breaker protects an electric low-voltage circuit and contains a mechanical separating contact unit, which has an open state of its contacts in order to prevent a current flow in the low-voltage circuit or a closed state of the contacts for a current flow in the low-voltage circuit, and an electronic interruption unit, which is connected in series to the mechanical separating contact unit on the circuit side and which, as a result of semiconductor-based switch elements, has a high-ohmic state of the switch elements in order to prevent a current flow or a low-ohmic state of the switch elements for a current flow in the low-voltage circuit. The level of the current of the low-voltage circuit is ascertained, and if at least one current threshold or a current/time threshold is exceeded, a process for preventing a current flow in the low-voltage circuit is initiated.

18 Claims, 5 Drawing Sheets

CIRCUIT BREAKER AND METHOD

FIELD AND BACKGROUND OF THE INVENTION

The invention relates to the technical field of a circuit breaker device for a low-voltage circuit having an electronic interruption unit. The circuit breaker device has a housing with connections for conductors of the electrical low-voltage circuit, a current sensor for ascertaining a level of a current of the electrical low-voltage circuit, and a mechanical isolating contact unit with contacts and an open state of the contacts prevents a current flow in the electrical low-voltage circuit and a closed state of the contacts allows a current flow in the electrical low-voltage circuit. An electronic interruption unit has semiconductor-based switching elements and is connected in series with the mechanical isolating contact unit on a circuit side and which, as a result of the semiconductor-based switching elements, has a high-impedance state of the semiconductor-based switching elements to prevent the current flow or a low-impedance state of the semiconductor-based switching elements for allowing the current flow in the electrical low-voltage circuit. A controller is connected to the current sensor, to the mechanical isolating contact unit and to the electronic interruption unit. If at least one current limit value or current-time limit value is exceeded a process for preventing the current flow in the electrical low-voltage circuit is initiated. The invention further relates to a method for operating a circuit breaker device for a low-voltage circuit having an electronic interruption unit.

Low voltage means voltages of up to 1000 volts AC or up to 1500 volts DC. Low voltage means in particular voltages that are greater than the extra-low voltage, with values of 50 volts AC or 120 volts DC.

Low-voltage circuit or network or system means circuits having nominal currents or rated currents of up to 125 amps, more specifically up to 63 amps. Low-voltage circuit means in particular circuits having nominal currents or rated currents of up to 50 amps, 40 amps, 32 amps, 25 amps, 16 amps or 10 amps. The stated current values mean in particular nominal, rated or/and switch-off currents, i.e. the maximum current normally carried via the circuit or usually resulting in the electrical circuit being interrupted, for example by a protection device, such as a circuit breaker device, miniature circuit breaker or power breaker.

Miniature circuit breakers are overcurrent protection devices that have been known for a long time and are employed in low-voltage circuits in electrical installation engineering. They protect lines from damage as a result of heating due to excessively high current and/or short circuit. A miniature circuit breaker can automatically break the circuit in the event of overload and/or short circuit. A miniature circuit breaker is a fusing element that does not automatically reset.

Power breakers, in contrast to miniature circuit breakers, are provided for currents greater than 125 A, in some cases even from as little as 63 amps. Miniature circuit breakers are therefore of simpler and more delicate design. Miniature circuit breakers normally have a mounting option for mounting on what is known as a top-hat rail (mounting rail, DIN rail, TH35).

Miniature circuit breakers are of electromechanical design. They have a mechanical switching contact or open-circuit shunt release in a housing in order to interrupt (trip) the electric current. A bimetallic protection element or bimetallic element is normally used for tripping (interruption) in the event of longer-lasting overcurrent (overcurrent protection) or in the event of thermal overload (overload protection). An electromagnetic trip with a coil is employed for brief tripping when an overcurrent limit value is exceeded or in the event of a short circuit (short circuit protection). One or more arc extinguishing chamber(s) or devices for arc extinction are provided. In addition, connecting elements for conductors of the electrical circuit that is to be protected.

Circuit breaker devices having an electronic interruption unit are relatively novel developments. They have a semiconductor-based electronic interruption unit. That is to say that the flow of electric current in the low-voltage circuit is carried via semiconductor components or semiconductor switches that are able to interrupt the flow of electric current or to be switched on. Circuit breaker devices having an electronic interruption unit also frequently have a mechanical isolating contact system, in particular having isolator properties according to relevant standards for low-voltage circuits, the contacts of the mechanical isolating contact system being connected in series with the electronic interruption unit, i.e. the current in the low-voltage circuit to be protected is carried both via the mechanical isolating contact system and via the electronic interruption unit.

The present invention in particular relates to low-voltage AC circuits, having an AC voltage, normally having a time-dependent sinusoidal AC voltage at the frequency f.

SUMMARY OF THE INVENTION

The object of the present invention is to improve a circuit breaker device of the type mentioned at the outset, in particular to improve the functionality of such a circuit breaker device or to present a novel concept for such a circuit breaker device.

This object is achieved by a circuit breaker device having the features of the independent circuit breaker device patent claim and by a method as claimed in the independent method patent claim.

According to the invention, provision is made for a circuit breaker device for protecting an electrical low-voltage circuit, in particular a low-voltage AC circuit, comprising:

- a housing having network-side and load-side connections for conductors of the low-voltage circuit,
- a current sensor unit for ascertaining the level of the current of the low-voltage circuit,
- a mechanical isolating contact unit which has an open state of contacts in order to prevent a current flow in the low-voltage circuit or a closed state of the contacts for a current flow in the low-voltage circuit, so that (in particular) electrical isolation in the low-voltage circuit is able to be switched, in the case of a mechanical isolating contact unit, opening of the contacts is also referred to as disconnection, and closing of the contacts is referred to as connection;

the mechanical isolating contact unit has in particular a mechanical handle which can be used to operate the mechanical isolating contact unit such that opening or closing of the contacts is possible;

- an electronic interruption unit which is connected in series with the mechanical isolating contact unit on the circuit side and which, as a result of semiconductor-based switching elements, has a high-impedance state of the switching elements in order to prevent a current flow or a low-impedance state of the switching elements for a current flow in the low-voltage circuit, in the case of an electronic interruption unit, a high-impedance (in particular non-conductive) state of the switching elements (for preventing a current flow) is also referred to as a switched-off state (process: switching off) and a low-impedance (conductive) state of the switching elements (for the current flow) is referred to as a switched-on state (process: switching on), a control unit which is connected to the current sensor unit, to the mechanical isolating contact unit and to the electronic interruption unit, wherein if current limit values or current-time limit values are exceeded a process for preventing a current flow in the low-voltage circuit is initiated.

According to the invention, the circuit breaker device has, for example, a communication interface, specifically a communication interface which is connected to the control unit. The communication interface is provided for configuration of the circuit breaker device, i.e. configuration can be carried out by means of the communication interface. According to the invention, if at least one parameter is exceeded, the manner of preventing a current flow in the low-voltage circuit is configurable.

That is to say that if the parameter is exceeded or undershot (exceeded or undershot depends on the nature of the parameter) a previously configured manner of preventing a current flow is initiated.

In this case, the manner of preventing the current flow is in particular:

a high-impedance state of the switching elements of the electronic interruption unit or an open state of the contacts of the mechanical isolating contact unit (in particular electrical isolation).

The nature of the parameter can, for example, be the electrical current, the voltage, the temperature, a value for identifying a serial arcing fault, the resistance, the impedance, or the like.

That is to say that, for example, if a current limit value or current-time limit value (when a current of a particular level is exceeded for a particular time) is exceeded, it is possible, for example, to configure the electronic interruption unit to become high-impedance, or to configure electrical isolation, or both, as the manner preventing current flow.

For example, for a first current limit value or current-time limit value (when a current of a particular level is exceeded for a particular time), it is possible to configure the electronic interruption unit to become high-impedance as the manner preventing current flow.

For example, for a second current limit value or current-time limit value, it is possible to configure the electronic interruption unit to become high-impedance, and to configure an open state of the contacts of the mechanical isolating contact unit, as the manner preventing current flow.

For example, for a third current limit value or current-time limit value, it is possible to configure an open state of the contacts of the mechanical isolating contact unit as the manner preventing current flow.

This has the particular advantage that a new functionality is available and a new concept for a circuit breaker device is presented, respectively.

Advantageous configurations of the invention are specified in the dependent claims and in the exemplary embodiment.

In one advantageous configuration of the invention, provision is made for a voltage sensor unit for ascertaining the level of the voltage of the low-voltage circuit and which is connected to the control unit.

In one advantageous configuration of the invention, provision is made for a temperature sensor unit for ascertaining the level of the temperature of the circuit breaker device and which is connected to the control unit.

In one advantageous configuration of the invention, provision is made for a differential current sensor, such as a summation current transformer, for ascertaining the level of a differential current in the low-voltage circuit and which is connected to the control unit.

This has the particular advantage that monitoring with regard to further parameters is available, wherein configuration of the behavior should be possible.

In one advantageous configuration of the invention, provision is made for a configuration store for storing the configuration of the manner of preventing the current flow in the low-voltage circuit in a non-volatile manner (retention in the deenergized state). The configuration store can be part of the control unit or be connected thereto.

This has the particular advantage that the adjusted behavior/the manner of preventing a current flow is retained even in the event of a power failure and so does not need to be entered again.

In one advantageous configuration of the invention, provision is made for a display unit which is connected to the control unit, in particular for displaying the (high-impedance or low-impedance) state of the switching elements of the electronic interruption unit. More specifically, the position of the contacts of the mechanical isolating contact unit can also in particular be displayed.

This has the particular advantage that a display of the switched-off or switched-on state of the electronic interruption unit is available.

In one advantageous configuration of the invention, the manner of preventing a current flow is configurable with regard to a first, second or/and third current limit value (as parameter).

In particular, the manner of preventing a current flow is configurable in each case for an ascertained current which exceeds a first current threshold value for a first period of time, or/and an ascertained current which exceeds a second current threshold value for a second period of time, or/and in the case of an ascertained current which exceeds a third current threshold value.

This has the particular advantage that different manners of preventing the current flow are configurable for different levels of current limit values.

In one advantageous configuration of the invention, the manner of preventing a current flow is configurable with regard to one of the following parameters, in particular a plurality or all of the following parameters:

a current limit value or/and current-time limit value being exceeded, a, in particular network-side, first overvoltage value or/and second overvoltage value being exceeded, a, in particular load-side, first or/and second differential current value being exceeded, a first undervoltage value being undershot, a first temperature limit value or/and second temperature limit value being exceeded, a load-side first or/and second resistance value or load-side first or/and second impedance value being undershot, a limit value for identifying serial arcing faults being exceeded, capacitance or inductance values being exceeded or undershot.

This has the particular advantage that configuration of the behavior with regard to particular variables (current, voltage, temperature, etc.), in particular graduated limit values of these variables, is available, as a result of which a convenient circuit breaker device which is able to be configured by the user is available.

In one advantageous configuration of the invention, one, in particular a plurality or all, of the following configurations is/are possible:

- that if the first overvoltage value is exceeded it is possible to configure the electronic interruption unit to become high-impedance, or to configure electrical isolation, or/and
- that if the second overvoltage value is exceeded it is possible to configure the electronic interruption unit to become high-impedance, or to configure electrical isolation, or/and
- that if the first differential current value is exceeded it is possible to configure the electronic interruption unit to become high-impedance, or to configure electrical isolation, or/and
- that if the second differential current value is exceeded it is possible to configure the electronic interruption unit to become high-impedance, or to configure electrical isolation, or/and
- that if the first undervoltage value is undershot it is possible to configure the electronic interruption unit to become high-impedance, or to configure electrical isolation, in particular if the voltage level is greater than a second undervoltage value, or/and
- that if the first temperature limit value is exceeded it is possible to configure the electronic interruption unit to become high-impedance, or to configure electrical isolation, or/and
- that if the second temperature limit value is exceeded it is possible to configure the electronic interruption unit to become high-impedance, or to configure electrical isolation, or/and
- that if the load-side first resistance value or load-side first impedance value is undershot it is possible to configure the electronic interruption unit to become high-impedance, or to configure electrical isolation, or/and
- that if the load-side second resistance value or load-side second impedance value is undershot it is possible to configure the electronic interruption unit to become high-impedance, or to configure electrical isolation, or/and
- that if the limit value for identifying serial arcing faults is exceeded it is possible to configure the electronic interruption unit to become high-impedance, or to configure electrical isolation.

This has the particular advantage that options for extensive configurable behavior are available.

In one advantageous configuration of the invention, provision is made for an input function which is connected to the control unit, in particular for acknowledging a high-impedance state of the switching elements of the electronic interruption unit after a parameter has been exceeded or undershot, respectively, with the result that a current flow in the low-voltage circuit is made possible again.

This has the particular advantage that switching-on again after confirmed exceedance or undershooting, respectively, is possible.

In one advantageous configuration of the invention, acknowledgment of a high-impedance state of the switching elements of the electronic interruption unit (EU), in particular after a parameter has been exceeded or undershot, respectively, is able to be carried out,

- in that, after acknowledgment,
- the high-impedance state remains or/and
- the low-impedance state of the switching elements of the electronic interruption unit is switched on again or/and
- an open state or closed state of the isolating contacts of the mechanical isolating contact unit is configurable.

This has the particular advantage that a further functionality of the circuit breaker device is configurable.

In one advantageous configuration of the invention, in the event of a parameter being exceeded or undershot and of a subsequent high-impedance state, it is possible, on the basis of the parameter, to configure the high-impedance state to remain, or to configure the low-impedance state of the switching elements of the electronic interruption unit (EU) to be switched on again.

For example, in the event of a parameter being exceeded or undershot in the resulting high-impedance state, this parameter can be checked and, if this parameter is no longer presently being exceeded or undershot, it is possible, on the basis of the parameter, to configure the high-impedance state to remain, or to configure the low-impedance state of the switching elements of the electronic interruption unit to be switched on again.

This has the particular advantage that further functionalities of the circuit breaker device are configurable.

In one advantageous configuration of the invention, if the low-impedance state is switched on again a number of times which exceeds a first limit value within a first period of time, a new switching-on operation is prevented despite the configuration.

This has the particular advantage that (in the case of a configured new switching-on operation) in the event of said limit value being exceeded or undershot, respectively, in a frequently recurring manner, continuous switching-on is prevented and operational safety is thus increased.

According to the invention, a corresponding method for a circuit breaker device for a low-voltage circuit having electronic (semiconductor-based) switching elements having the same and further advantages is claimed.

The method for a circuit breaker device for protecting an electrical low-voltage circuit, having:

- a mechanical isolating contact unit which has an open state of contacts in order to prevent a current flow in the low-voltage circuit or a closed state of the contacts for a current flow in the low-voltage circuit;
- an electronic interruption unit which is connected in series with the mechanical isolating contact unit on the circuit side and which, as a result of semiconductor-based switching elements, has a high-impedance state of the switching elements in order to prevent a current flow or a low-impedance state of the switching elements for a current flow in the low-voltage circuit;

wherein the level of the current of the low-voltage circuit is ascertained and if current limit values or current-time limit values are exceeded a process for preventing a current flow in the low-voltage circuit is initiated.

According to the invention, the manner of preventing a current flow in the low-voltage circuit can be configured for at least one parameter.

For example, for current, voltage, temperature, differential current or current limit value/current-time limit value, overvoltage value, undervoltage value, temperature limit value, differential current limit value, etc.

For example, if a parameter is exceeded (or undershot) it is possible to carry out a configuration with regard to a high-impedance state of the switching elements of the electronic interruption unit or an open state of the contacts of the mechanical isolating contact unit.

According to the invention, a corresponding computer program product is claimed. The computer program product comprises commands which, when the program is executed by a microcontroller, cause the latter to carry out configuration of the manner of preventing a current flow in the low-voltage circuit for a circuit breaker device as claimed in one of the patent claims. The microcontroller is part of the circuit breaker device, in particular of the control unit.

According to the invention, a corresponding computer-readable storage medium on which the computer program product is stored is claimed.

According to the invention, a corresponding data carrier signal which transmits the computer program product is claimed.

All configurations, both in dependent form referring back to the independent claims and referring back only to individual features or combinations of features of patent claims, in particular also a reference of the dependent arrangement claims back to the independent method claim, result in an improvement in a circuit breaker device, in particular in the functionality of such a circuit breaker device, and present a novel concept for such a circuit breaker device.

The described properties, features and advantages of this invention and the way in which they are achieved will become clearer and more distinctly comprehensible in connection with the following description of the exemplary embodiments which are explained in more detail in connection with the drawing.

DETAILED DESCRIPTION OF THE INVENTION

Figure 1:
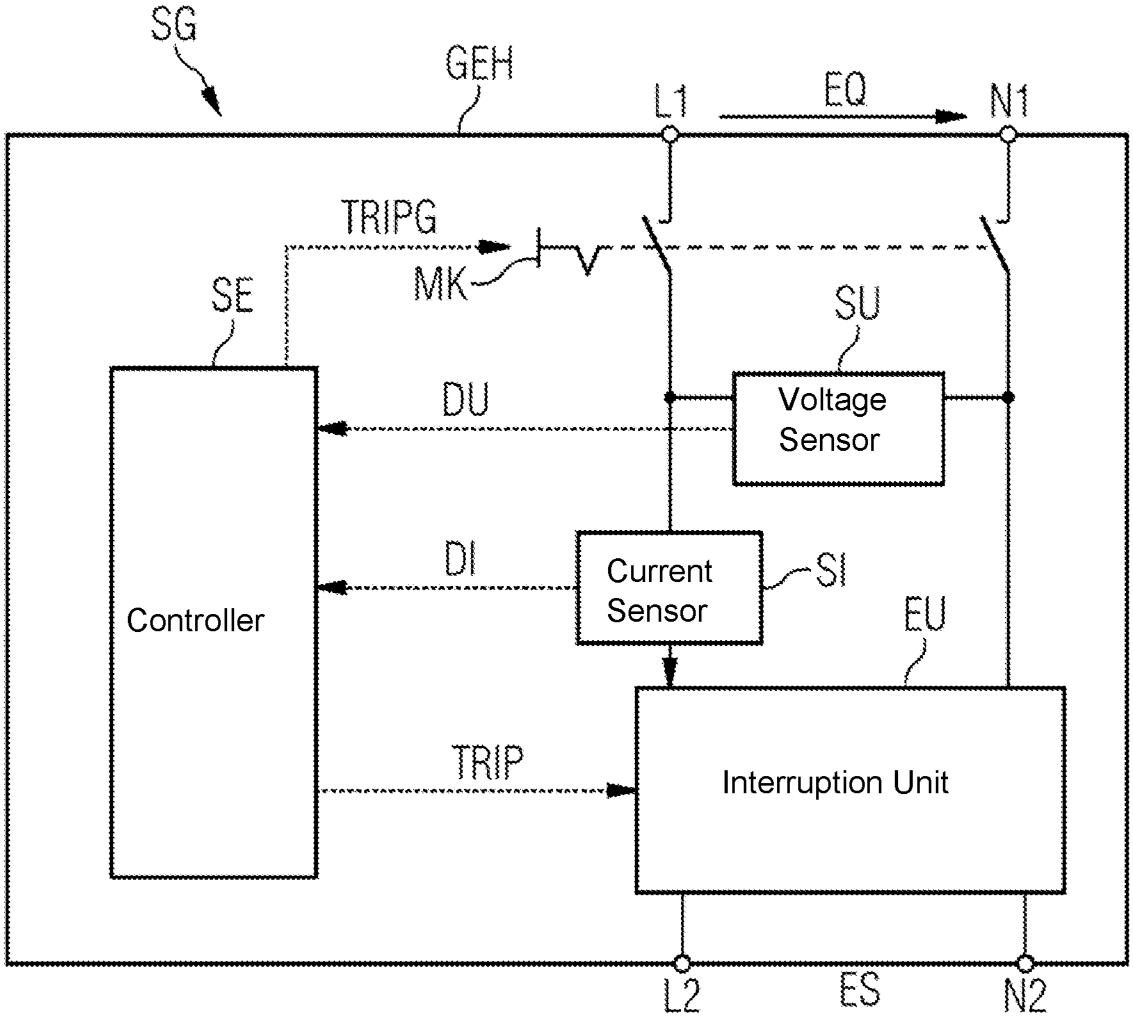
FIG. 1 shows a first illustration of a circuit breaker device.

FIG. 1 shows an illustration of a circuit breaker device SG for protecting an electrical low-voltage circuit, comprising:

a housing having (in particular network-side and load-side) connections (L1, N1, L2, N2) for conductors of the low-voltage circuit, in particular first network-side connections L1, N1 for a network-side, in particular energy-source-side, connection EQ of the circuit breaker device SG and second load-side connections L2, N2 for a load-side, in particular energy-sink-side (in the case of passive loads), connection ES (consumer-side connection) of the circuit breaker device SG, wherein phase-conductor-side connections L1, L2 and neutral-conductor-side connections N1, N2 may specifically be provided;

the load-side connection L2, N2 can comprise a passive load (consumer) or/and an active load ((further) energy source), or a load which can be both passive and active, e.g. in a time sequence;

an optional voltage sensor unit SU for ascertaining the level of the voltage of the low-voltage circuit such that in particular instantaneous (phase-angle-related) voltage values DU are available, a current sensor unit SI for ascertaining the level of the current of the low-voltage circuit such that in particular instantaneous (phase-angle-related) current values DI are available, a mechanical isolating contact unit MK which is able to be switched and able to be operated in particular using a mechanical handle, with the result that opening of contacts in order to prevent a current flow or closing of the contacts for a current flow in the low-voltage circuit is able to be switched (in particular using the handle), so that (in particular) electrical isolation in the low-voltage circuit is able to be switched;

in the case of the mechanical isolating contact unit MK, opening of contacts is also referred to as disconnection, and closing of contacts is referred to as connection;

an electronic interruption unit EU which is connected in series with the mechanical isolating contact unit MK on the circuit side and which, as a result of semiconductor-based switching elements, has a high-impedance state of the switching elements in order to prevent a current flow and a low-impedance state of the switching elements for the current flow in the low-voltage circuit;

in the case of the electronic interruption unit EU, a high-impedance state of the switching elements (for preventing a current flow) is also referred to as a switched-off state (process: switching off) and a low-impedance (conductive) state of the switching elements (for the current flow) is referred to as a switched-on state (process: switching on);

a control unit (SE) which is connected to the current sensor unit (SI), to the mechanical isolating contact unit (MK) and to the electronic interruption unit (EU), wherein if current limit values or current-time limit values (i.e. if a current limit value is exceeded for a particular period of time) are exceeded a process for preventing a current flow in the low-voltage circuit is initiated, in particular in order to prevent a short-circuit current.

The network-side connections L1, N1 are connected, on the one hand, to the mechanical isolating contact unit MK. The mechanical isolating contact unit MK is connected, on the other hand, to the electronic interruption unit EU. The electronic interruption unit EU is connected, on the other hand, to the load-side connections L2, N2.

The voltage sensor unit SU and the current sensor unit SI are arranged between the mechanical isolating contact unit MK and the electronic interruption unit EU.

The circuit breaker device SG can comprise an energy supply having a power supply unit NT (not shown in FIG. 1).

The power supply unit NT is connected, on the one hand, to the conductors of the low-voltage circuit, preferably to the conductors between the mechanical isolating contact unit MK (=mechanical isolating contact system) and the electronic interruption unit EU. The power supply unit NT is used, on the other hand, to supply energy to the control unit SE or/and to the electronic interruption unit EU and possibly to the voltage sensor SU or/and current sensor SI.

The circuit breaker device SG, in particular the control unit SE, can preferably comprise a microcontroller (=microprocessor) on which runs a computer program product comprising commands which, when the program is executed by the microcontroller, cause the latter to provide or carry out a configuration of the circuit breaker device (as described above and below) if a parameter for a circuit breaker device is exceeded (or undershot).

The computer program product can advantageously be stored on a computer-readable storage medium, such as a USB stick, CD-ROM, etc., in order to allow an upgrade to an enhanced version, for example.

Alternatively, the computer program product can also advantageously be transmitted by a data carrier signal.

The circuit breaker device SG, in particular the control unit SE, is configured in such a way that if parameters, such as e.g. current limit values or current-time limit values (i.e. if a current limit value is exceeded for a particular period of time), are exceeded a process for preventing a current flow in the low-voltage circuit is initiated, in particular in order to prevent a short-circuit current in this example. This is achieved in particular by virtue of the electronic interruption unit EU changing from the low-impedance state to the high-impedance state. The process for preventing a current flow in the low-voltage circuit is initiated, for example, by a first interruption signal TRIP which is sent from the control unit SE to the electronic interruption unit EU, as shown in FIG. 1.

Alternatively, the process for preventing a current flow in the low-voltage circuit can be initiated, for example, by a second interruption signal TRIPG which is sent from the control unit SE to the mechanical isolating contact unit MK in order to open the contacts, as shown in FIG. 1.

According to the invention, the circuit breaker device (SG) is configured in such a way that if at least one parameter, such as e.g. a current limit value, in particular e.g. a plurality of current limit values, or e.g. at least one current-time limit value, in particular e.g. a plurality of current-time limit values, is/are exceeded the manner of preventing a current flow (by the electronic interruption unit (EU) or(/and) the mechanical isolating contact unit (MK)) is configurable.

According to FIG. 1, the electronic interruption unit EU is shown as a block in both conductors. Therefore, in a first variant, this means no interruption of both conductors. At least one conductor, in particular the active conductor or rather phase conductor, comprises semiconductor-based switching elements. The neutral conductor can be free of switching elements, i.e. without semiconductor-based switching elements. That is to say that the neutral conductor is connected directly, i.e. does not become high-impedance. That is to say that only single-pole interruption (of the phase conductor) takes place. If further active conductors/phase conductors are provided, in a second variant of the electronic interruption unit EU, the phase conductors comprise semiconductor-based switching elements. The neutral conductor is connected directly, i.e. does not become high-impedance. For example for a three-phase AC circuit.

In a third variant of the electronic interruption unit EU, the neutral conductor can likewise comprise a semiconductor-based switching element, i.e. both conductors become high-impedance when the electronic interruption unit EU is interrupted.

The electronic interruption unit EU can comprise semiconductor components such as bipolar transistors, field-effect transistors (FETs), isolated-gate bipolar transistors (IGBTs), metal-oxide-layer field-effect transistors (MOSFETs) or other (self-commutated) power semiconductors. In particular, IGBTs and MOSFETs are particularly well suited to the circuit breaker device according to the invention owing to low flow resistances, high junction resistances and good switching behavior.

In a first variant, the mechanical isolating contact unit MK can carry out single-pole interruption. That is to say that only one conductor of the two conductors, in particular the active conductor or rather phase conductor, is interrupted, i.e. has a mechanical contact. The neutral conductor is then free of contacts, i.e. the neutral conductor is connected directly.

If further active conductors/phase conductors are provided, in a second variant, the phase conductors comprise mechanical contacts of the mechanical isolating contact system. In this second variant, the neutral conductor is connected directly. For example for a three-phase AC circuit.

In a third variant of the mechanical isolating contact system MK, the neutral conductor likewise comprises mechanical contacts, as shown in FIG. 1.

Mechanical isolating contact unit MK means in particular a (standard-compliant) isolating function, provided by the isolating contact unit MK. Isolating function means the following points:

- minimum air gap according to the standard (minimum distance between the contacts),
- contact position display of the contacts of the mechanical isolating contact system,
- actuation of the mechanical isolating contact system (using the handle) always possible (no blocking of the isolating contact system), in particular disconnection/tripping is possible at any time, i.e. in particular a trip-free mechanism (mechanical switching device having a trip-free mechanism), i.e. in particular a mechanical switching device the moving contacts of which return to the open position and remain therein if the opening (i.e. tripping) is initiated after the beginning of the closing, even if the closing command is maintained.

With regard to the minimum air gap between the contacts of the isolating contact system, this is substantially voltage-dependent. Further parameters are the degree of soiling, the type of field (homogeneous, inhomogeneous) and the air pressure or the height above sea level.

There are appropriate regulations or standards for these minimum air gaps or creepage distances. In air, for example, these regulations indicate the minimum air gap for a surge withstand capability for an inhomogeneous and a homogeneous (ideal) electrical field on the basis of the degree of soiling. The surge withstand capability is the strength when an applicable surge voltage is applied. Only if this minimum length (minimum distance) exists does the isolating contact system or circuit breaker device have an isolating function (isolator property).

Within the context of the invention, the series of standards DIN EN 60947, or IEC 60947, which are mentioned here by way of reference, are relevant to the isolator function and the properties thereof in this instance.

The isolating contact system is advantageously characterized by a minimum air gap between the open isolating contacts in the OFF position (open position, open contacts) on the basis of the rated surge withstand capability and the degree of soiling. The minimum air gap is in particular between (a minimum of) 0.01 mm and 14 mm.

In particular, the minimum air gap is advantageously between 0.01 mm at 0.33 kV and 14 mm at 12 kV, in particular for degree of soiling 1 and in particular for inhomogeneous fields.

The minimum air gap can advantageously have the following values:

E DIN EN 60947-1 (VDE 0660-100):2018-06

TABLE 13

| Rated surge withstand capability Uimp kV | minimum air gaps, Minimm air gaps mm, Case A inhomogeneous field (see 3.7.63) Degree of soiling 1 | 2 | 3 | 4 | Case B homogeneous field, ideal conditions (see 3.7.62) Degree of soiling 1 | 2 | 3 | 4 |
|---|---|---|---|---|---|---|---|---|
| 0.33 | 0.01 | 0.2 | 0.8 | 1.6 | 0.01 | 0.2 | 0.8 | 1.6 |
| 0.5 | 0.04 | | | | 0.04 | | | |
| 0.8 | 0.1 | | | | 0.1 | | | |
| 1.5 | 0.5 | 0.5 | | | 0.3 | 0.3 | | |
| 2.5 | 1.5 | 1.5 | 1.5 | | 0.6 | 0.6 | | |
| 4.0 | 3 | 3 | 3 | 3 | 1.2 | 1.2 | 1.2 | |
| 6.0 | 5.5 | 5.5 | 5.5 | 5.5 | 2 | 2 | 2 | 2 |
| 8.0 | 8 | 8 | 8 | 8 | 3 | 3 | 3 | 3 |
| 12 | 14 | 14 | 14 | 14 | 4.5 | 4.5 | 4.5 | 4.5 |

NOTE
The smallest air gaps indicated are based on the 1.2/50-μs surge voltage at an air pressure of 80 kPa, corresponding to the air pressure at 2000 m above sea level.

The degrees of soiling and types of field are consistent with those defined in the standards. As a result, a standard-compliant circuit breaker device dimensioned according to the rated surge withstand capability can advantageously be achieved.

According to the invention, the circuit breaker device SG is configured in such a way that the electronic interruption unit EU is high-impedance in the disconnected state, i.e. when the contacts of the mechanical isolating contact unit MK are open.

If a user of the circuit breaker device SG operates the mechanical handle for a switching-on process in order to close the contacts, a checking function is carried out, in particular after closing the contacts (i.e. connection). If the checking function delivers a positive result, the electronic interruption unit EU becomes low-impedance. Otherwise not.

Figure 2:
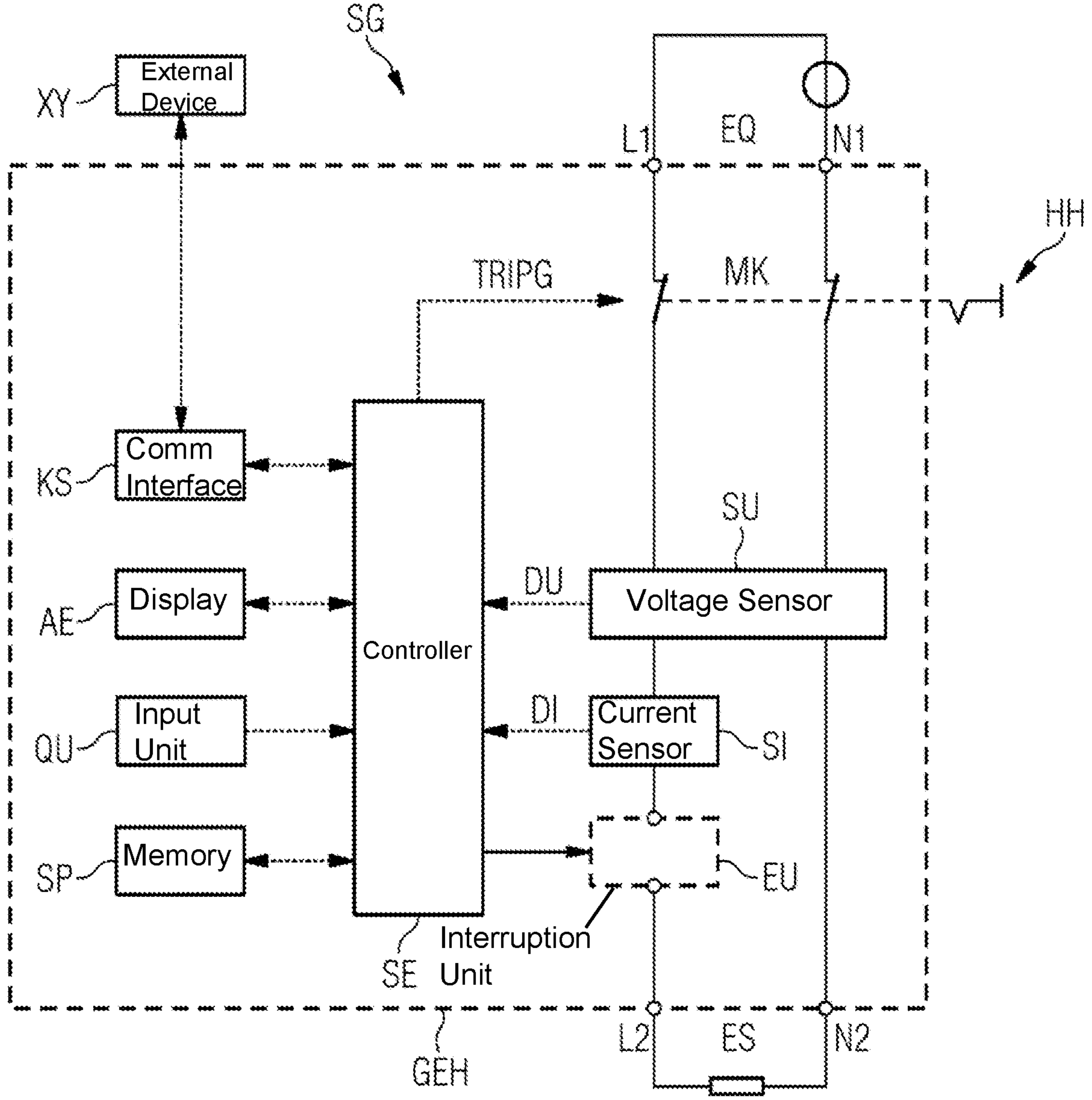
FIG. 2 shows a second illustration of a circuit breaker device.

FIG. 2 shows an illustration of a circuit breaker device SG according to FIG. 1 with the following differences.

The electronic interruption unit EU is in the form of a unit which carries out single-pole interruption.

The mechanical isolating contact unit MK is in the form of a unit which carries out two-pole interruption (electrically interrupting).

The mechanical isolating contact unit MK comprises a handle HH by means of which opening or closing of the contacts is possible such that the mechanical isolating contact unit is operable.

The control unit SE is connected to a communication interface KS for the configuration of the circuit breaker device, in particular for the configuration according to the invention of the manner of preventing a current flow if at least one current limit value or current-time limit value of the low-voltage circuit is exceeded.

The communication interface KS can be programmable by a user XY or an external device XY such that the manner of preventing a current flow is configurable.

The control unit SE can be connected to a display unit AE for displaying parameters or states of the circuit breaker device SG, in particular for displaying the state of the electronic interruption unit EU (high-impedance or/and low-impedance), specifically for displaying the state of the switching elements of the electronic interruption unit EU.

The control unit SE can be connected to an input unit QU, specifically to an acknowledgment button, for example, for acknowledging states of the circuit breaker device, specifically states of the electronic interruption unit EU.

The control unit (SE) is connected to a configuration store (SP) for storing the configuration of the manner of preventing the current flow in the low-voltage circuit in a non-volatile manner (i.e. the configuration is stored in the deenergized state). The configuration store can, for example, be a flash memory, flash EPROM, NVRAM, FeRAM, MRAM or PCRAM.

The circuit breaker device SG can further comprise a summation current transformer for ascertaining differential currents of the low-voltage circuit. The manner of preventing a current flow can likewise be configurable for when differential current limit values are exceeded.

The circuit breaker device SG can further comprise one or more temperature sensors for ascertaining the level of the temperature of the circuit breaker device SG.

The manner of preventing the current flow can be

- a high-impedance state of the switching elements of the electronic interruption unit (EU) or
- an open state of the contacts of the mechanical isolating contact unit (MK).

One example is presented in the following configuration table. A fault type is entered in the first column. Short circuit is, for example, the exceedance of a current limit value. Overload is, for example, the exceedance of a current-time limit value. Residual current is, for example, the exceedance of a differential current limit value (differential current value). Overtemperature is, for example, the exceedance of a temperature limit value. Overvoltage is, for example, the exceedance of an overvoltage value. Undervoltage is, for example, the exceedance of an undervoltage value. Serial arcing fault is, for example, the exceedance of an arcing fault identification threshold value.

The manner of preventing a current flow if the respective parameter (current limit value, current-time limit value, differential current limit value, temperature limit value, overvoltage value, undervoltage value, etc.) is exceeded (i.e. the tripping behavior) is entered or configured in the second column "tripping behavior".

For example, for a short circuit, i.e. the exceedance of a current limit value, provision is made for the switching elements of the electronic interruption unit EU to become high-impedance (OFF) and for the contacts of the mechanical isolating contact unit MK to open (OFF).

The prevention of the current flow through the respective unit is denoted here by OFF. Whereas a non-tripping of the respective unit if the parameter is exceeded, i.e. a current flow in the low-voltage circuit, is denoted by ON.

For example, for an overload, i.e. the exceedance of a current-time limit value, provision or configuration is made for the switching elements of the electronic interruption unit EU to become high-impedance (OFF) but for the contacts of the mechanical isolating contact unit MK not to open, i.e. the contacts remain closed (ON).

For example, for a residual current, i.e. the exceedance of a differential current limit value, provision is made for the switching elements of the electronic interruption unit EU to become high-impedance (OFF) and for the contacts of the mechanical isolating contact unit MK to open (OFF).

For example, for an overvoltage, i.e. the exceedance of an overvoltage value, provision or configuration is made for the switching elements of the electronic interruption unit EU to become high-impedance (OFF) but for the contacts of the mechanical isolating contact unit MK not to open, i.e. the contacts remain closed (ON). The same applies for overtemperature, undervoltage and serial arcing fault.

The behavior for one value or limit value of a parameter is shown in each case in the configuration table. In a similar way, the tripping behavior, i.e. the manner of preventing a current flow, can be configured for a plurality of values of a parameter. For example, for a first (low) overvoltage value and second (higher) overvoltage value. In a similar way, for a first (low) and second (higher) differential current value; a first (low) temperature limit value and second (higher) temperature limit value.

In a similar way, further parameters may be able to be ascertained and able to be configured, for example parameters of the load-side connection, in particular in response to a load-side first or/and second resistance value or load-side first or/and second impedance value being undershot.

In one advantageous configuration, furthermore, the behavior of the circuit breaker device after a fault may be configurable. This is shown by way of example in the third column "reconnection". In the example, after an overload (exceedance of a current-time limit value) the device can allow the current flow again; this is denoted by "automatic". That is to say that, in the example, the electronic interruption unit becomes low-impedance automatically, for example after a (parameter-dependent) length of time has expired.

In a similar way, in the example, after an overtemperature (exceedance of a temperature limit value) the device can allow the current flow again, denoted by "automatic". That is to say that, in the example, the electronic interruption unit becomes low-impedance automatically, for example if the temperature has fallen below the temperature limit value. Alternatively, if the temperature has fallen below the temperature limit value minus an offset amount, which can be a fixed temperature amount or a percentage.

In a similar way, in the example, after an overvoltage (exceedance of an overvoltage value) the device can allow the current flow again, denoted by "automatic". That is to say that, in the example, the electronic interruption unit becomes low-impedance automatically, for example if the overvoltage has dropped, i.e. has fallen below the overvoltage value. The same applies for undervoltage.

Likewise, in the example, after a serial arcing fault the device can allow the current flow again if this state is acknowledged; this is denoted by "after acknowledgment". That is to say that, in the example, the electronic interruption unit becomes low-impedance if the identification of a serial arcing fault is acknowledged manually on the device by a user, with the result that a current flow in the low-voltage circuit is made possible again.

Furthermore, after a process for preventing the current flow through the electronic interruption unit EU and the mechanical isolating contact unit MK, automatically switching on again may not be possible or not allowed, denoted by "n.a.", since the circuit breaker device is intended to be switched on again manually using the handle (manually on the device).

Example of a Configuration Table

| | Configuration | |
|---|---|---|
| Fault type | Tripping behavior | Reconnection |
| Short circuit | MK: OFF<br>EU: OFF | n.a.<br>(manually on the device) |
| Overload | MK: ON<br>EU: OFF | Automatically |
| Residual current | MK: OFF<br>EU: OFF | n.a.<br>(manually on the device) |
| Overtemperature | MK: ON<br>EU: OFF | Automatically |
| Overvoltage | MK: ON<br>EU: OFF | Automatically |
| Undervoltage | MK: ON<br>EU: OFF | Automatically |
| Serial arcing fault | MK: ON<br>EU: OFF | After acknowledgment |

Figure 3:
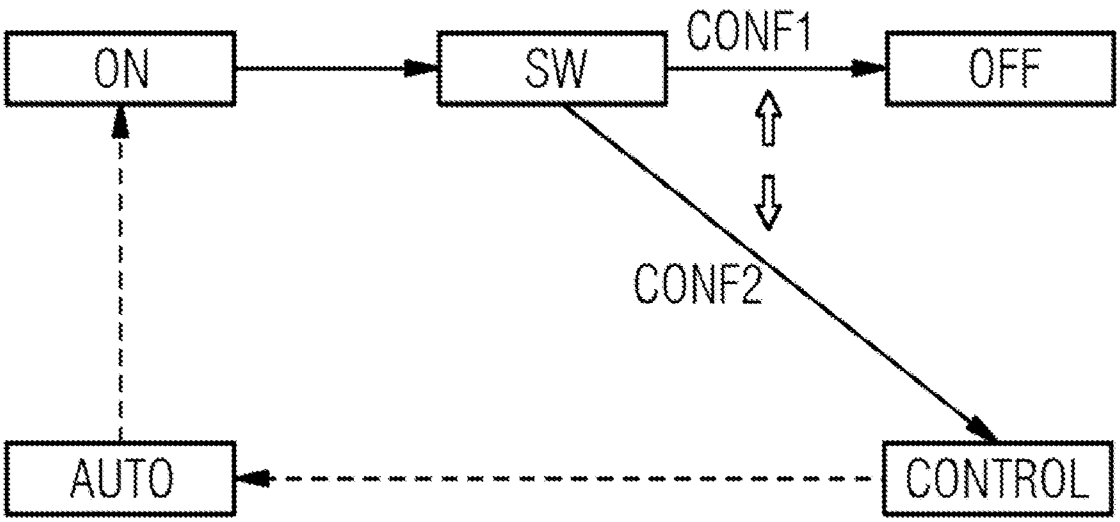
FIG. 3 shows a first illustration of states of a circuit breaker device.

FIG. 3 shows an illustration of states of a circuit breaker device. In FIG. 3, three states ON, OFF and CONTROL of the circuit breaker device SG are illustrated.

In the ON state, the circuit breaker device SG is connected and switched on, i.e. the mechanical isolating contact unit MK is closed and the electronic interruption unit EU is low-impedance. (The circuit breaker device SG is (normally) supplied with energy.) A current in the electrical low-voltage circuit can flow.

In the OFF state, the circuit breaker device SG is disconnected and switched off, i.e. the mechanical isolating contact unit MK is open and the electronic interruption unit EU is high-impedance.

In the CONTROL state, the circuit breaker device SG is connected and switched off, i.e. the mechanical isolating contact unit MK is closed and the electronic interruption unit EU is high-impedance.

According to the invention, if values or limit values (current, current-time, overvoltage, undervoltage, temperature, resistance, impedance, etc.) are exceeded, which is illustrated by the threshold value block or the threshold value function SW, the manner of preventing the current flow can be configured. That is to say that if values or limit values are exceeded in the threshold value block or the threshold value function SW, ascertained by the control unit SE or its microprocessor together with a computer program product (e.g. firmware/software), either the OFF state or the CONTROL state can arise (indicated by arrows). This behavior is configurable. For example, a first configuration CONF1 can be used to reach the OFF state. For example, a second configuration CONF2 can be used to reach the CONTROL state.

Advantageously, it is possible to reach the ON state again from the CONTROL state by means of the switch-on block or the switch-on function AUTO, carried out by the control unit SE or its microprocessor together with a computer program product (e.g. firmware/software), if corresponding criteria are met (e.g. values/limit values are undershot again or a length of time has expired). Alternatively, acknowledgment can take place.

Figure 4:
FIG. 4 shows a second illustration of states of a circuit breaker device.

FIG. 4 shows an illustration according to FIG. 3, in which the classic case of tripping from the ON state to the OFF state if values are exceeded, ascertained by the threshold value block or the threshold value function SW, is illustrated.

Figure 5:
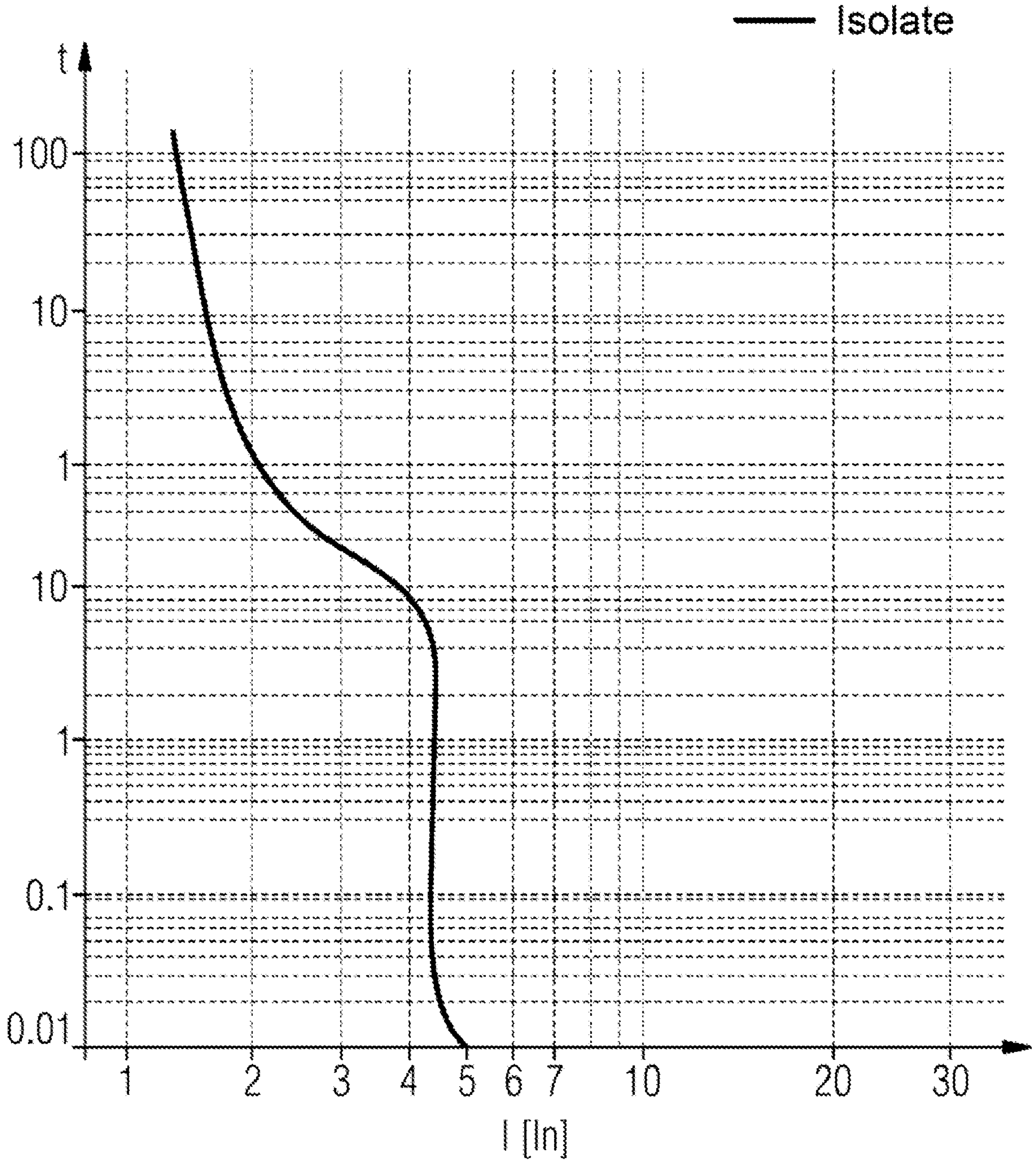
FIG. 5 shows a first illustration of a diagram with a current-time characteristic curve.

FIG. 5 shows a diagram with the relationship of a current I in the low-voltage circuit to a rated current In of the circuit breaker device SG on the horizontal X-axis. The tripping time t until the prevention of a current flow in the low-voltage circuit is illustrated on the vertical Y-axis. The diagram illustrates a tripping curve in which the associated tripping time t at which the OFF state, marked by "Isolate", is reached is plotted for a relationship of a current I in the low-voltage circuit to a rated current In. The diagram according to FIG. 5 is, for example, for the classic case according to FIG. 4.

Figure 6:
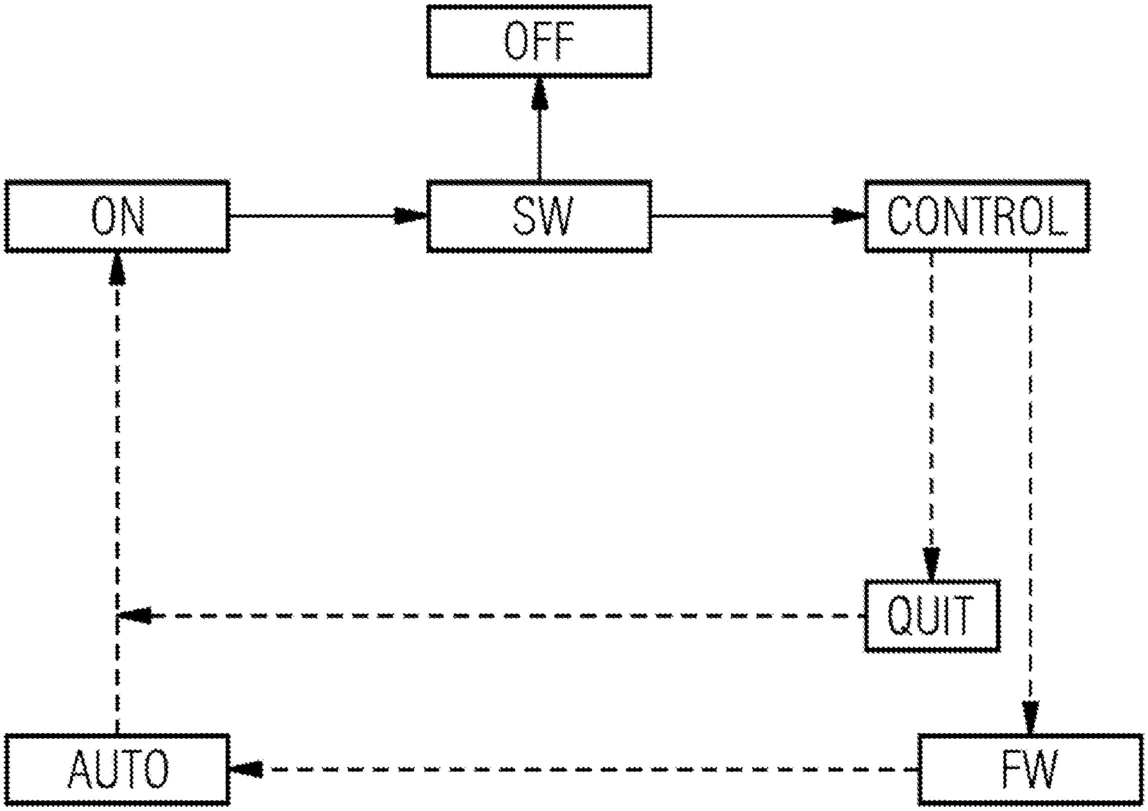
FIG. 6 shows a third illustration of states of a circuit breaker device.

FIG. 6 shows an illustration according to FIG. 3 or FIG. with the difference that the behavior from the CONTROL state to the ON state is illustrated in more detail. On the one hand, it is advantageously possible to reach the ON state again from the CONTROL state at particular/configurable parameters by means of the switch-on block or the switch-on function AUTO if corresponding criteria are met (e.g. values/limit values are undershot again or a length of time has expired). This can be performed by an enable block or an enable function FW. This can be configured.

On the other hand, it is advantageously possible to reach the ON state again from the CONTROL state at particular/configurable parameters by means of the acknowledgment block or the acknowledgment function QUIT if acknowledgment (of the high-impedance state of the switching elements of the electronic interruption unit EU) takes place after a parameter has been exceeded or undershot, respectively. This can be configured. A current flow in the low-voltage circuit is thereby made possible again.

In order to prevent continuous switching off and on again in the event of e.g. toggling faults, if the low-impedance state is switched on again a number of times which exceeds a first limit value within a first period of time, a new switching-on operation can be prevented or inhibited despite the configuration. Increased operational safety is thus achieved.

High impedance means a state in which only a current of a negligible magnitude flows. In particular, high impedance means resistance values of greater than 1 kiloohm, preferably greater than 10 kiloohms, 100 kiloohms, 1 megohm, 10 megohms, 100 megohms, 1 gigaohm or greater.

Low impedance means a state in which the specified current value can flow, i.e. a current value for which the circuit breaker device is provided.

In particular, low impedance means resistance values of less than 10 ohms, preferably less than 1 ohm, 100 milliohms, 10 milliohms, 1 milliohm, 100 microohms or less.

Although the invention has been described and illustrated more specifically in detail by means of the exemplary embodiment, the invention is not restricted by the disclosed examples and other variations may be derived therefrom by a person skilled in the art without departing from the scope of protection of the invention.

The invention claimed is:

1. A circuit breaker for protecting an electrical low-voltage circuit, the circuit breaker comprising:
- a housing having connections for conductors of the electrical low-voltage circuit,
- a current sensor for ascertaining a level of a current of the electrical low-voltage circuit;
- a mechanical isolating contact unit having contacts and an open state of said contacts preventing a current flow in the electrical low-voltage circuit or a closed state of said contacts allowing the current flow in the electrical low-voltage circuit;
- an electronic interruption unit having semiconductor-based switching elements, said electronic interruption unit connected in series with said mechanical isolating contact unit on a circuit side and which, as a result of said semiconductor-based switching elements, having a high-impedance state of said semiconductor-based switching elements to prevent the current flow or a low-impedance state of said semiconductor-based switching elements for allowing the current flow in the electrical low-voltage circuit; and
- a controller connected to said current sensor, to said mechanical isolating contact unit and to said electronic interruption unit, wherein if at least one current limit value or current-time limit value is exceeded a process for preventing the current flow in the electrical low-voltage circuit is initiated, wherein a manner of preventing the current flow in the electrical low-voltage circuit is configurable based on at least one parameter being exceeded or undershot, and wherein said manner of preventing the current flow in the electrical low-voltage circuit is configured to be the high-impedance state of said semiconductor-based switching elements of said electronic interruption unit or the open state of said contacts of said mechanical isolating contact unit.

2. The circuit breaker according to claim 1, further comprising a communication interface for configuring the circuit breaker and said communication interface is connected to said controller, wherein said manner of preventing the current flow in the electrical low-voltage circuit is configurable by means of said communication interface.

3. The circuit breaker according to claim 1, wherein said isolating contact unit has a mechanical handle which is used to operate said mechanical isolating contact unit to open or close said contacts.

4. The circuit breaker according to claim 1, further comprising a voltage sensor for ascertaining a level of a voltage of said electrical low-voltage circuit and said voltage sensor is connected to said controller.

5. The circuit breaker according to claim 1, further comprising a temperature sensor for ascertaining a level of a temperature of the circuit breaker and said temperature sensor is connected to said controller.

6. The circuit breaker according to claim 1, further comprising a configuration store for storing a configuration of a said manner of preventing the current flow in the electrical low-voltage circuit in a non-volatile manner.

7. The circuit breaker according to claim 1, further comprising a display connected to said controller, said display displays a state of said semiconductor-based switching elements of said electronic interruption unit and/or a position of said contacts of said mechanical isolating contact unit.

8. The circuit breaker according to claim 1, wherein the at least one parameter includes at least one of the following:
- the current limit value and/or the current-time limit value being exceeded;
- a first overvoltage value and/or a second overvoltage value being exceeded;
- a first differential current value and/or second differential current value being exceeded;
- a first undervoltage value being undershot;
- a first temperature limit value and/or a second temperature limit value being exceeded;
- a load-side first resistance value and/or second resistance value or a load-side first impedance value and/or second impedance value being undershot; and
- a limit value for identifying serial arcing faults being exceeded.

9. The circuit breaker according to claim 8, wherein:
- if the first overvoltage value is exceeded said electronic interruption unit is configured to have the high-impedance state, or said mechanical isolating contact unit is configured to have the open state; and/or
- if the second overvoltage value is exceeded said electronic interruption unit is configured to have the high-impedance state, or said mechanical isolating contact unit is configured to have the open state; and/or if a first differential current value is exceeded said electronic interruption unit is configured to have the high-impedance state, or said mechanical isolating contact unit is configured to have the open state; and/or if a second differential current value is exceeded said electronic interruption unit is configured to have the high-impedance state, or said mechanical isolating contact unit is configured to have the open state; and/or if the first undervoltage value is undershot it is possible to configure said electronic interruption unit is configured to have the high-impedance state, or said mechanical isolating contact unit is configured to have the open state; and/or if the first temperature limit value is exceeded said electronic interruption unit is configured to have the high-impedance state, or said mechanical isolating contact unit is configured to have the open state; and/or if the second temperature limit value is exceeded said electronic interruption unit is configured to have the high-impedance state, or said mechanical isolating contact unit is configured to have the open state; and/or if the load-side first resistance value or the load-side first impedance value is undershot said electronic interruption unit is configured to have the high-impedance state, or said mechanical isolating contact unit is configured to have the open state; and/or if the load-side second resistance value or the load-side second impedance value is undershot said electronic interruption unit is configured to have the high-impedance state, or said mechanical isolating contact unit is configured to have the open state; and/or if the limit value for identifying serial arcing faults is exceeded said electronic interruption unit is configured to have the high-impedance state, or said mechanical isolating contact unit is configured to have the open state.

10. The circuit breaker according to claim 1, wherein said manner of preventing the current flow is configurable with regard to a first current limit, a second current limit and/or a third current limit value.

11. The circuit breaker according to claim 10, wherein said manner of preventing the current flow is configurable for an ascertained current which exceeds a first current threshold value for a first period of time, and/or an ascertained current which exceeds a second current threshold value for a second period of time, and/or an ascertained current which exceeds a third current threshold value.

12. The circuit breaker according to claim 1, further comprising an input function connected to said controller for acknowledging the high-impedance state of said semiconductor-based switching elements of said electronic interruption unit after the at least one parameter has been exceeded or undershot, respectively, with a result that the current flow in the electrical low-voltage circuit is allowed again.

13. The circuit breaker according to claim 1, wherein acknowledgment of the high-impedance state of said semiconductor-based switching elements of said electronic interruption unit is configured to be carried out, and, after the acknowledgment:

the high-impedance state remains; and/or the low-impedance state of said semiconductor-based switching elements of said electronic interruption unit is switched on again; and/or the open state or the closed state of said contacts of said mechanical isolating contact unit is configurable.

14. The circuit breaker according to claim 1, wherein in an event that the at least one parameter is exceeded or undershot and of a subsequent said high-impedance state, on a basis of the at least one parameter, the high-impedance state is configured to remain, or the low-impedance state of said semiconductor-based switching elements of said electronic interruption unit is configured to be switched on again, the at least one parameter is checked and, if the at least one parameter is no longer presently being exceeded or undershot, on a basis of the at least one parameter, the high-impedance state is configured to remain, or the low-impedance state of said semiconductor-based switching elements of said electronic interruption unit is configured to be switched on again.

15. The circuit breaker according to claim 14, wherein if the low-impedance state is switched on again a number of times which exceeds a first limit value within a first period of time, a subsequent switching-on operation is prevented.

16. A non-transitory computer program comprising computer executable code which, when executed by a microcontroller, causes the microcontroller to carry out a configuration of the circuit breaker according to claim 1.

17. A non-transitory computer-readable storage medium having computer-executable instructions which, when executed by a microcontroller, cause the microcontroller to carry out a configuration of the circuit breaker according to claim 1.

18. A method for operating a circuit breaker for protecting an electrical low-voltage circuit, the circuit breaker having:

a mechanical isolating contact unit having an open state of contacts to prevent a current flow in the electrical low-voltage circuit or a closed state of the contacts to allow the current flow in the electrical low-voltage circuit; and an electronic interruption unit connected in series with the mechanical isolating contact unit on a circuit side and which, as a result of semiconductor-based switching elements, has a high-impedance state of the semiconductor-based switching elements to prevent the current flow or a low-impedance state of the semiconductor-based switching elements to allow the current flow in the electrical low-voltage circuit;

the method comprises the steps of:

ascertaining a level of a current of the electrical low-voltage circuit; and initiating a process for preventing the current flow in the electrical low-voltage circuit if at least one current limit value or current-time limit value is exceeded, a manner of preventing the current flow in the electrical low-voltage circuit includes the substeps of:

transitioning the semiconductor-based switching elements of the electronic interruption unit to the high-impedance state; or transitioning the contacts of the mechanical isolating contact unit to the open state;

wherein said manner of preventing the current flow in the electrical low-voltage circuit is configurable based on at least one parameter being exceeded or undershot.

* * * * *